United States Patent [19]

Gonzalez

[11] Patent Number: 5,141,524
[45] Date of Patent: Aug. 25, 1992

[54] CATALYTIC CLEAN COMBUSTION PROMOTER COMPOSITIONS FOR LIQUID FUELS USED IN INTERNAL COMBUSTION ENGINES

[76] Inventor: Frank Gonzalez, 601 Jefferson, Ste. 320, Houston, Tex. 77002

[21] Appl. No.: 608,526

[22] Filed: Nov. 2, 1990

[51] Int. Cl.$^5$ ............................................. C10L 1/22
[52] U.S. Cl. .................................... 44/340; 44/414; 44/426; 44/439; 44/449; 44/451
[58] Field of Search ................. 44/340, 414, 426, 439, 44/451, 449

[56] References Cited

U.S. PATENT DOCUMENTS

| | | | |
|---|---|---|---|
| 3,002,827 | 10/1961 | Fenske | 44/451 |
| 3,163,504 | 12/1964 | Calvino | 44/340 |
| 4,131,434 | 12/1978 | Gonzalez | 44/413 |
| 4,682,984 | 7/1987 | Epler | 44/448 |

Primary Examiner—Margaret Medley
Attorney, Agent, or Firm—Kenneth A. Roddy

[57] ABSTRACT

The incorporation of these catalytic clean combustion promoters compositions to liquid fuels for internal combustion engines, improve their combustion properties; thus, reducing their air polluting emissions as nitrogen oxides ($NO_x$), carbon monoxide (CO), and unburned hydrocarbons (HC). Also, these fuel activators reduce smoke and particulate matter exhaust emissions. Moreover, the addition of these fuel activators, reduce the corrosion properties of fuels, clean the whole fuel systems of gums and varnishes, clean and prevent carbon deposits on injectors, valves and on the combustion chamber parts.

The composition of these catalytic clean combustion promoters additives includes aromatic and aliphatic hydrocarbon solvents with and without oxygenated functional groups, aromatic amines, a catalytic agent in chemical reactions, nitroparaffin solvents, aliphatic ether as an octaine assistant, and/or Kerosene as a cetane assistant.

These chemical compositions can be incorporated to liquid fuels derivated from petroleum oils in microvolumetric concentrations ranging from 400 to 2,500 parts per million (ppm.) by volume of engine fuel.

3 Claims, No Drawings

CATALYTIC CLEAN COMBUSTION PROMOTER COMPOSITIONS FOR LIQUID FUELS USED IN INTERNAL COMBUSTION ENGINES

CROSS REFERENCE TO RELATED APPLICATION

This application is related to application Ser. No. 726,317 filed Sep. 24, 1976, now U.S. Pat. No. 4,131,434 granted on Dec. 26, 1978.

OBJECTS OF THE INVENTION

As suggested above, the object of the invention is to provide chemical mixtures that when added to petroleum based fuels, they improve the combustion-ability of the latter, during their combustion process.

Another object of the invention is that these catalytic clean combustion promoters are effective when added in concentrations of parts per million (ppm) by volume of fuel. A further and fundamental object of the invention is that by adding these catalytic clean combustion promoter compositions to fuels in micro-amounts, the resonance radiation from the core of the flame during the combustion process is enlarged; thus, yielding a cooling effect along the outer edge of the flame. Therefore, the foregoing effect reduces the temperature of the fire gases along the flame and consequently the exhaust emissions of nitrogen oxides ($NO_x$) are diminished.

A further object of the invention is that by adding these catalytic clean combustion promoter to fuels in micro-amounts, the surface tension of the fuels is reduced. The preceding physical change reduces the size of the fuel droplets during the atomization process in the injectors; thus, allowing to burn more efficiently the hydrocarbons in the fuels which are the culprits of the exhaust emissions, such as carbon monoxide CO) and unburned hydrocarbons (HC).

A further object of the invention is that by adding these catalytic clean combustion promoters the corrosion properties of the fuels are reduced.

A still further object of the invention is that by incorporating these catalytic clean combustion promoters to fuels, the whole fuel systems are cleaned of gums and varnishes, and remove the particles of carbon built-up on injectors, valves, and on the combustion engine parts. These and other objects of the invention will be evident from the content of the following specifications and appended claims.

SUMMARY OF THE INVENTION

Accordingly, the invention provides catalytic clean combustion promoter compositions for use with liquid engine fuels derived from petroleum oils, may comprise aromatic and aliphatic hydrocarbon solvents with and without oxygenated functional groups, aromatic amines, a catalytic agent in chemical reactions, nitroparaffin product compounds. MTBE or ETBE as an octane assistant and/or kerosene as a cetane assistant. Such additives may be employed in micro-amounts ranging from 400 to 2,500 parts per million by volume of fuel.

More particularly this invention provides additives which may comprise:

1) From 1 to 15 percent by volume of any one or a mixture of an aromatic amine such as N-Ethylaniline $C_9H_{12}N_3$ or Aniline $C_6H_7N_{11}$ 2) From 1 to 25 percent by volume of any one or a mixture of aromatic hydrocarbon solvents such as Toluene $C_7H_8$, or Xylene $C_8H_{10}$ 3) from 1 to 45 percent by volume of any one or a mixture of aliphatic ketone solvent such as 2-Pentanone, or 4-Methyl $C_6H_{12}O$, or 2-Butanone $C_4H_8O$ 4) From 1 to 30 percent by volume of any one or a mixture of alipahtic alcohols as 2Propanol $C_3H_8O_3$ or isobutyl alcohol $C_4H_{10}O$ 5) From 1 to 15 percent by volume of a catalytic agent in chemical reactions as 1-Methyl, 2-Pyrollidinone $C_5H_9NO$ 6) From 1 to 45 percent by volume of any one or a mixture of nitroparaffin solvents such as 1-Nitropropane $CH_3CH_2CH_2NO_2$, or 2-Nitropropane $CH_3CH(NO_2)CH_3$ 7) From 1 to 85 percent by volume of any one or a mixture of Methyl Tert-Butyl Ether (MTBE), or Ethyl Tert-Butyl Ether ($ETBE_{11}$) used as an octane assistant.

8) From 1 to 60 percent by volume of any one or a mixture of Kerosene, or a paraffinic/naphthenic solvent used as a cetane assistant.

This invention refers to improvements in catalytic clean combustion promoters of the hydrocarbon type for liquid fuels derived from petroleum.

These catalytic clean combustion promoters are chemical mixtures, subject to total combustion at the same temperature as the fuels. Due to the unexpected and surprising synergistic effect of these chemical compounds the incorporation of these catalytic clean combustion promoters to liquid fuels derived from petroleum, promote physical changes as the rearrangement of their molecular structure, through chemical bonding, and the reduction of the surface tension. The preceding effect makes that the fuels be burned more efficiently, so, yielding a great reduction of exhaust emissions such as unburned hydrocarbons (HC), carbon monoxide (CO), and nitrogen oxides ($NO_x$).

Besides, the addition of these catalytic clean combustion promoters to engines fuels, clean the whole in take system of gum and varnish formations, and clean the combustion chamber parts of carbon particle deposits; thus, reducing the necessity of using engine fuels with a higher cetane or octane number. Moreover, their catalyzing action reduces the corrosion properties of the fuels.

Such catalytic clean combustion promoters have been found to be effective when added in micro-amounts ranging from 400 to 2,500 per million (ppm.) by volume of fuel, although the invention is not restricted exclusively thereto.

In Table "A", at the top of each column are giving the specifics amounts of the catalytic activator which must be added to the respective engine fuel, in ratios ranging from 400 to 2,500 parts per million (ppm.) by volume of fuel, regardless whether the chemical components are in the lower or upper percentage range by volume ratio.

TABLE "A"

| Compounds | Catalytic Promoter "G" for unleaded gasoline. Mixture ratio from 400 ppm to 2.500 ppm by volume | Catalytic Promoter "D" for diesel fuel Mixture ratio from 400 ppm to 2.500 ppm by volume |
|---|---|---|
| 1) Aromatic Amine N-Ethylaniline | from 1 to 15% by volume | |

TABLE "A"-continued

| Compounds | Catalytic Promoter "G" for unleaded gasoline. Mixture ratio from 400 ppm to 2,500 ppm by volume | Catalytic Promoter "D" for diesel fuel Mixture ratio from 400 ppm to 2,500 ppm by volume |
|---|---|---|
| $C_8H_{11}N$ or Aniline $C_6H_7N$ | | |
| 2) Aromatic hydrocarbon solvents. Toluene $C_7H_8$ or Xylene $C_8H_{10}$ | from 1 to 25% by volume | |
| 3) Aliphatic Ketone solvents 2-Pentanone, 4 methyl $C_6H_{12}O$ or 2-Butanone | from 1 to 35% by volume | from 1 to 45% by volume |
| $C_4H_8O$ | | |
| 4) Aliphatic Alcohol 2-Propanol $C_3H_8O$ or IBA | from 1 to 30% by volume | from 1 to 35% by volume |
| 5) Catalytic Agent 1-Methyl. 2 Pyrrolidinone $C_5H_9NO$ | from 1 to 15% by volume | from to 20% by volume |
| 6) Nitroparaffin solvents 1-Nitropropane $CH_3CH_2CH_2NO_2$ or 2-Nitropropane $CH_3CH(NO_2)CH_3$ | from 1 to 40% by volume | from 1 to 45% |
| 7) MTBE or ETBE as an Octane assistant | fron 1 to 85% by volume | |
| 8) Kerosene or Paraffinic/naphthenic Solvent as a Cetane assistant | | fron 1 to 40% by volume |
| Total Volume | 100% | 100% |

CATALYTIC PROMOTER "G" FOR UNLEADED GASOLINE TYPICAL PHYSICAL PROPERTIES

| Description | ASTM-METHOD | |
|---|---|---|
| Form | | Liquid |
| Appearance | | Light/amber |
| Color | D-1500 | L 1 |
| Density, Lbs/Gal @ 60° F. | D-1298 | 7.443 |
| Specific gravity @ 60° F. | D-1298 | 0.8939 |
| API Gravity @ 60° F. | D-1298 | 26.8 |
| Pour point °F. | D-97 | −70.0 |
| Flash point PMCC, °F. | D-93 | 56.0 |

-continued

CATALYTIC PROMOTER "G" FOR UNLEADED GASOLINE TYPICAL PHYSICAL PROPERTIES

| Viscosity, CST. @ 100° F. | D-445 | 0.75 |
|---|---|---|

In-House Evaluation Results of the Efficacy of the Catalytic Promoter "G" for Unleaded Gasoline as a Fuel Efficiency Enhancer The Highway Fuel Economy Test (HFET) 40 CFR Part 600 of the Environmental Protection Agency (EPA) was used to demonstrate the effectiveness of the Catalytic Promoter "G" for unleaded gasoline. This test concluded that by adding the Catalytic Promoter "G" to an unleaded gasoline contributes to reduce the exhaust emissions of nitrogen oxides ($NO_x$), carbon monoxide (CO) and unburned hydrocarbons (HC).

IN HOUSE TEST
WEIGHT FINAL TEST RESULTS
MASS EMISSIONS IN GRAMS/MILE

| | Vehicle: Oldsmobile | | VIN 2G3AJ5135J9841147 | | |
|---|---|---|---|---|---|
| | Model: Cutlass Cierra | | Odom. 30,000 miles | | |
| | Year: 1988 | | Trans Auto | | |
| POLLUTANT | BASELINE NO "G" | BASEFUEL WITH "G" | CHANGES % | CALIFORNIA | FEDERAL |
| HC | 0.227 | 0.215 | −5.3 | | 0.41 |
| CO | 2.249 | 1.741 | −22.6 | 7.0 | 3.40 |
| $NO_x$ | 0.366 | 0.274 | −25.1 | 0.7/.4 | 1.00 |
| $CO_2$ | 433.288 | 425.829 | −1.7 | | |
| $CH_4$ | 0.028 | 0.025 | −10.7 | | |
| NMHC | 0.202 | 0.193 | −4.4 | 0.39 | |
| MPG | 20.285 | 20.677 | +1.9 | | |

This test was done by an independent laboratory that has the capacity and equipment which is identical or equivalent to used by the EPA.

Induction System Deposit (ISD) Tendencies of Motor Gasoline (Federal Test Method Std. No. 791C.)

This method is used for determining the tendencies of motor gasolines to form gum and varnish deposits in the induction systems region (intake manifold and intake valve regions) of spark ignition engines. This technique uses a bench apparatus, designed to simulate the valve and port area of an engine intake system, which provided deposit data correlative to real engines. The apparatus is compact, requires a minimal fuel sample, uses a retainable metal tube as deposit collecting surface, and has a good repeat-ability.

The following test have been done at Southwest Research Institute facilities in San Antonio, Texas.

ISD Bench Test

The test conditions of the test were:
ISD Bar Temperature: 375° F.±5° F.
Flow rate: 2 mls. per minute
Total Volume: 100 mls Baseline Gasoline ISD index 0.2 mg/100 mls
Gasoline Plus the Catalytic Promoter "G"
ISD index 0.0 mg/100 mls The results of this test indicted a 100 percent decreased in ISD index deposits when the Activator "G" was incorporated to an unleaded gasoline.

Evaluation of the Efficacy of the Catalytic Promoter "G" as a Fuel Injector Cleaner Agent Data:
Fuel used: Phillips J reference unleaded gasoline
Laboratory: Southwest Research Institute, at San Antonio, Tex.
Previous condition:

1The test was run for a total of 36 hours, with injector plugging reference fuel through the injectors. There were three injectors per engine test. The fuel used to plug the injectors was a special unleaded gasoline "VP Reference".

2. At the end of the 36 hour test period, each injector was compared to the initial flow.

3. Each injector was then available to carry out the evaluation of the Catalytic Promoter's "G" injector cleaning ability. This was done on a flow bench apparatus.

4. The Catalytic Promoter "G" was blended into Phillips J unleaded gasoline reference. The fuel equivalent to an 18 fuel tank was flowed through a plugged fuel injector and then the flow checked again to determine the Catalytic Promoter's "G" cleaning ability.

The test showed the following results:

Injector No. 1 at the end of 36 hours on engine injector plugging procedure was 8.3 percent plugged.

Injector No. 1 at the end of only 4.5 gallons of treated Phillips J unleaded gasoline with the Catalytic Promoter "G", the result was 0 percent plugged.

Injector No. 2 at the end of 36 hours on engine injector plugging procedure was 8.1 percent plugged.

Injector No. 2 at the end of only 4.5 gallons of treated Phillips J unleaded gasoline with the Catalytic Promoter "G", the result was 0 percent plugged.

Injector No. 25 baseline run at the end of 36 hours on engine injector plugging procedure was 8.1 percent plugged.

Injector No. 25 at the end of 4.5 gallons of untreated Phillips J unleaded gasoline, the results showed 8.1 percent plugged. That means there was no clean-up by using untreated Phillips J unleaded gasoline only.

Evaluation in Southwest Research Institute of the Efficacy of the Catalytic Promoter "G" as an Inhibitor Agent to Control the Corrosion Properties of Unleaded Gasolines The reduction of the corrosion properties of the gasoline were demonstrated by using the Rust Test Method designed by the National Association of Corrosion Engineers (NACE), when the Catalytic Promoter "G" is used to a regular unleaded gasoline.

The analyses were done by blending the Catalytic Promoter "G" in Phillips J unleaded gasoline. Moreover, the addition of the Catalytic Promoter "G" in unleaded gasolines does not increase the vapor pressure of the latter according to Reid Vapor Pressure (RVP) method.

The results on the basis fuel and on the fuel treated with the Catalytic Promoter "G" are shown in the table below.

| SAMPLE | RVP | NACE Rating |
|---|---|---|
| Phillip J Run A | 7.8 | D |
| Phillips J Run B | 7.11 | D |
| Promoter "G" added Run A | 7.01 | B+ |
| Promoter "G" added Run B | 6.93 | B+ |

Experience has shown that enough inhibitor present to produce B+ or B++ results by this test will control corrosion in active pipe

| Rating | Proportion of Test Surface Rusted |
|---|---|
| Baseline D | From 50 to 75% |
| Fuel treated B+ | Less than 5% |
| Percentage of change From baseline | −90% |

| CATALYTIC PROMOTER "D" FOR DIESEL FUEL TYPICAL PHYSICAL PROPERTIES | | |
|---|---|---|
| Description | ASTM-METHOD | |
| Form | | Liquid |
| Appearance | | CLEAR |
| Color | D-1500 | 0 |
| Density, Lbs/Gal @ 60° F. | D-1298 | 7.438 |
| Specific gravity @ 60° F. | D-1298 | 0.8933 |
| API Gravity @ 60° F. | D-1298 | 26.9 |
| Pour point °F. | D-97 | −70.0 |
| Flash point PMCC, °F. | D-93 | 70.0 |
| Viscosity, CST. @ 100° F. | D-445 | 0.91 |

The cetane Nr. is an indication of the ignition quality of a diesel engine fuel, and it depends mainly of its hydrocarbon composition.

When fuel is injected into the diesel engine combustion chamber, ignition does not occur immediately, there is a time consuming process. The time that takes to heat the fuel droplets, to turn then into vapor and start combustion is called ignition delay or lag. The surface tension is relevant to delay ignition time which affects cetane Nr.

The surface tension of the liquid diesel fuel affects its atomization (the diameter of the droplet) hence the ignition delay of the diesel fuel. Due to its catalytic action when the Catalytic Promoter "D" is added to a diesel engine fuel, its surface tension is reduced; thus allowing to burn more efficiently the hydrocarbons in the fuels, therefore decreasing the emission of pollutants. Moreover, the preceding physical changes increases the resonance radiation from the core of the flame; hence yielding a cooling effect along the outer edge of the flame. Consequently the exhaust emissions of nitrogen oxides ($NO_x$) are reduced.

Evaluation of the Efficacy of the Catalytic Promoter "D" for Diesel Engine Fuel as a Fuel Efficiency Enhancer The following analyses were done at Southwest Research Institute in San Antonio, Tex., by blending the Catalytic Promoter "D" for diesel in Phillips 66 diesel fuel lot G-892.

| Test |
|---|

-continued

| | |
|---|---|
| Surface tension @ 25.5° C. ASTM-D971, dynes/cm | |
| Baseline diesel fuel | 26.23 |
| Baseline fuel + the Promoter "D" | 24.78 |
| Percentage of change from baseline | −5.5% |

The following analyses were done at E. W. Saybolt & Co., Inc. Laboratories in Pasadena, Tex. by using Shell Light Cyclic Oil (L.C.O.) J-309 fuel.

| | |
|---|---|
| Surface tension @ 25.5° C. ASTM-D971, dynes/cm | |
| Baseline diesel fuel | 38.2 |
| Baseline fuel + the Promoter "D" | 22.8 |
| Percentage of change from baseline | −40.3% |

Evaluation of the Efficacy of the Catalytic Promoter "D" for Diesel Engine Fuel as a Fuel Efficiency Enhancer Diesel Fuel Economy Test The following diesel fuel economy tests have been completed on the Catalytic Promoter "D" for diesel engine fuel blended in the base fuel. The blend was allowed to stand for two hours prior to testing. The Nr. 2 diesel fuel specifications were:

API 29.4 Specific Gravity 0.877 7.321 LB/Gal

The test procedure as described below was performed by using a Clayton Industrial Dynamometer model A-3505 with a rebuild Detroit Diesel engine model BV-71-T mounted, at Orange County Transit District facilities in Irving, Calif.

After setting each engine conditions following a fifteen minute equilibration period, four (4) fuel consumption readings were made beginning with the base line fuel and later with the same base fuel blended with the Catalytic Promoter "D" for diesel fuel.

The fuel consumption measurements were taken using a triple scale method whereby, and the period time required was six (6) minutes for each test. Three load conditions at 1800 RPM's were tested as follows:

| TEST LOAD | CONDITION PERCENTAGE | BHP LOAD | RPM | TIME | FUEL USED IN/LBS |
|---|---|---|---|---|---|
| 1a) | Baseline 42% | 100 HP | 1,800 | 6 min | 4.99 |
| 1b) | Fuel treated | 100 HP | 1,800 | 6 min | 4.68 |
| | Fuel savings 6.2% avg. by using the Catalytic "D" Clean Combustion Promoter for diesel engine fuel. | | | | |
| 2a) | Baseline 84% | 200 HP | 1,800 | 6 min | 7.94 |
| 2b) | Fuel treated | 200 HP | 1,800 | 6 min | 7.72 |
| | Fuel savings 2.77% avg. by using the Catalytic "D" Clean Combustion Promoter for diesel engine fuel. | | | | |
| 3a) | Baseline maximum | 237 HP | 1,800 | 6 min | 9.22 |
| 3b) | Fuel treated | 237 HP | 1,800 | 6 min | 9.04 |
| | Fuel savings 1.98% avg. by using the Catalytic "D" Clean Combustion Promoter for diesel engine fuel. | | | | |
| 4a) | Baseline | No-load | 2,000 | 6 min | 1.99 |
| 4b) | Fuel treated | No-load | 2,000 | 6 min | 1.98 |
| | No fuel savings at no-load | | | | |

Evaluation of the Efficacy of the Catalytic "D" Clean Combustion Promoter for Diesel Engine Fuel As a Fuel Efficiency Enhancer Diesel Fuel Economy Test The following diesel fuel economy tests have been completed on the Catalytic "D" Clean Combustion Promoter for engine diesel fuel blender in the base fuel. The blend was allowed to stand for two hours prior to testing.

The test procedure as described below was performed by using a Clayton Industrial Dynamometer with a new PERKINS Engine model C6.354.2 mounted, at PERKINS ENGINES CO., facilities in Toluca, Mexico.

After setting each engine conditions following a sixty minute equilibration period, one (1) fuel consumption reading was made beginning with the base line fuel and later with the same base fuel blended with the Catalytic "D" Clean Combustion Promoter for engine diesel fuel.

The fuel consumption measurements were taken using a triple scale method whereby, and the period time required was sixty (60) minutes for each test. One load condition at 2800 RPM's was tested as follows:

| TEST LOAD | CONDITION PERCENTAGE | BHP LOAD | RPM | TIME | FUEL USED LTS/HP |
|---|---|---|---|---|---|
| 1a) | Baseline | 106.48 HP | 2,800 | 60 min | 0.27728 |
| 1b) | Fuel treated | 108.62 HP | 2,800 | 60 min | 0.26310 |
| | Fuel savings 5.0% avg. by using the Catalytic "D" Clean Combustion Promoter for diesel engine fuel. | | | | |

Test Results on Smoke Opacity

| FUEL BASE LINE SMOKE BOSH UNITS | FUEL PLUS CATALYTIC "D" |
|---|---|
| 5.4 | 3.8 |

The test results showed a 29.6% smoke Bosh units reduction.

I claim:

1. A petroleum derived fuel composition of improved efficiency comprising a basic liquid engine fuel selected from the group comprising diesel fuel for compression ignition engines and unleaded gasolines for spark ignition engines and a chemical catalytic clean combustion promoter composition comprising a mixture by volume of:

an alcohol selected from the group consisting of isopropyl alcohol and isobutyl alcohol from 1 to 35%, 1-methyl-2-pyrrolidone used as a catalytic medium for increasing the chemical reaction rate of the composition from 1 to 20%, a ketone solvent selected from the group consisting of methyl isobutyl ketone and methyl ethyl ketone from 1 to 45% an aromatic hydrocarbon solvent selected from the group consisting of toluene and xylene from 1 to 25%, an aromatic amine selected from the group consisting of n-ethylaniline and aniline from 1 to 20%, a cetane assistant selected from the group consisting of kersone and paraffinic/naphthenic solvent from 1 to 60%, an oxygenated compound selected from the group consisting of MTBE and ETBE used as an octane assistant for gasolene fuels from 1 to 85%, and a nitroparaffin compound selected from the group consisting of 1-nitropropane and 2-nitropopane from 1 to 85%, said catalytic clean combustion promoter compositions being present in micro volumetric concentrations between 400 to 2,500 parts per million (ppm) by volume of the basic liquid engine fuel, regardless whether the chemical components are in the lower or upper percentage range by volume ratio.

2. A fuel composition according to claim 1 comprising:
  a basic diesel fuel for compression ignition engines, and
  a catalytic clean combustion promoter composition comprising by volume:
  a cetane assistant solvent selected from the group consisting of kerosene and paraffin/naphthenic from 1 to 60%, a ketone solvent selected from the group consisting of methyl isobutyl ketone and methyl ketone from 1 to 45%, a solvent selected from the group consisting of isopropyl alcohol and isobutyl alcohol from 1 to 35%, 1-methyl-2-pyrrolidone catalytic medium from 1 to 20%, and a nitroparaffin compound selected from the group consisting of 1-nitropropane and 2-nitropropane from 1 to 45%
  said catalytic clean combustion promoter compositions being present in micro volumetric concentrations between 400 to 2,500 parts per million (ppm) by volume of the basic diesel fuel, regardless whether the chemical components are in the lower or upper percentage range by volume ratio.

3. A fuel composition according to claim 1 comprising:
  a basic unleaded gasoline fuel for spark ignition engines, and
  a catalytic clean combustion promoter composition comprising by volume:
  a ketone solvent selected from the group consisting of methyl isobutyl ketone and methyl ethyl ketone from 1 to 45%, an alcohol solvent selected from the group consisting of isopropyl alcohol and isobutyl alcohol from 1 to 30%, 1-methyl-2-pyrrolidone catalytic medium 1 to 15%, an aromatic amine selected from the group consisting of n-ethylaniline and aniline from 1 to 15%, an oxygenated compound selected from the group consisting of MTBE and ETBE from 1 to 85%, a nitroparaffin compound selected from the group consisting of 1-nitropropane and 2-nitropropane from 1 to 45%, and an aromatic hydrocarbon solvent selected from the group consisting of toluene and xylene from 1 to 25%,
  said catalytic clean combustion promoter compositions being present in micro volumetric concentrations between 400 to 2,500 parts per million (ppm) by volume of the basic unleaded gasoline, regardless whether the chemical components are in the lower or upper percentages range by volume ratio.

* * * * *